J. W. RAFFERTY.
STEERING GEAR FOR HOOK AND LADDER TRUCKS.
APPLICATION FILED AUG. 17, 1914.
1,126,863.
Patented Feb. 2, 1915.
3 SHEETS—SHEET 1.
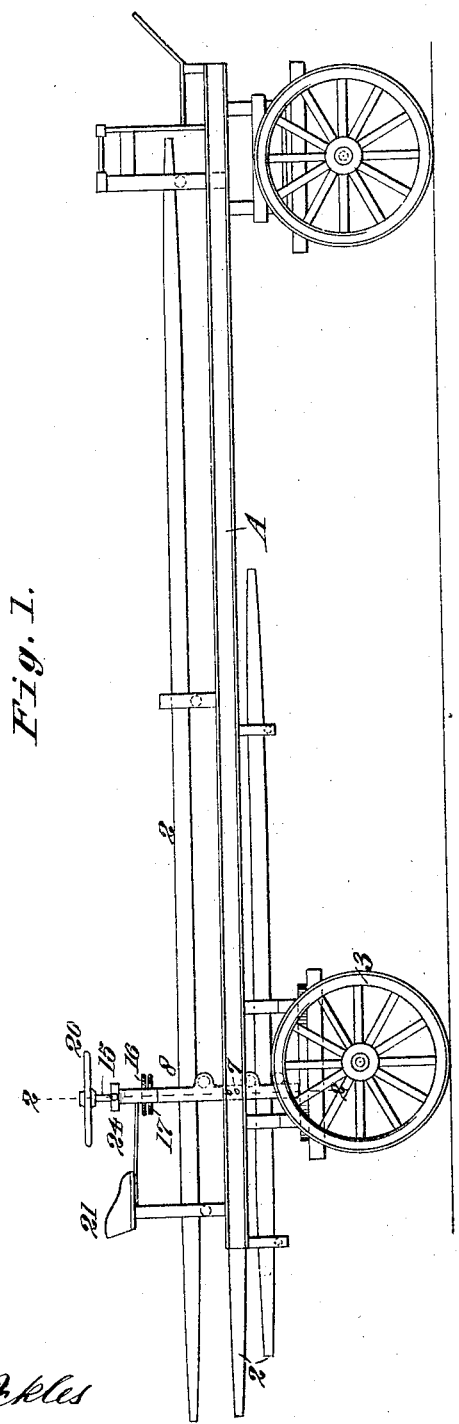
WITNESSES:
Charles Pickles
Thos Eastberg
INVENTOR
John W. Rafferty.
BY G. H. Strong.
ATTORNEY

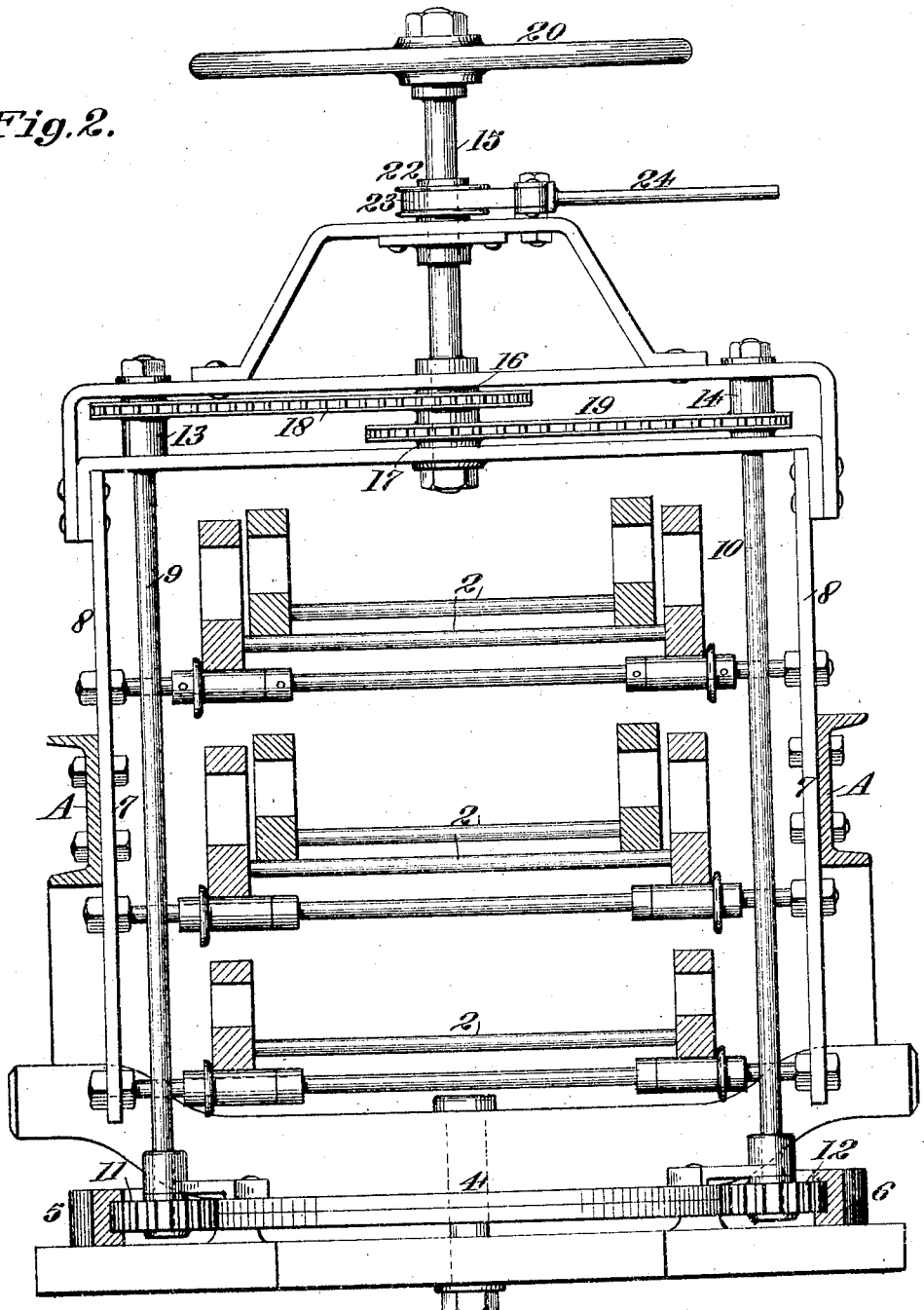

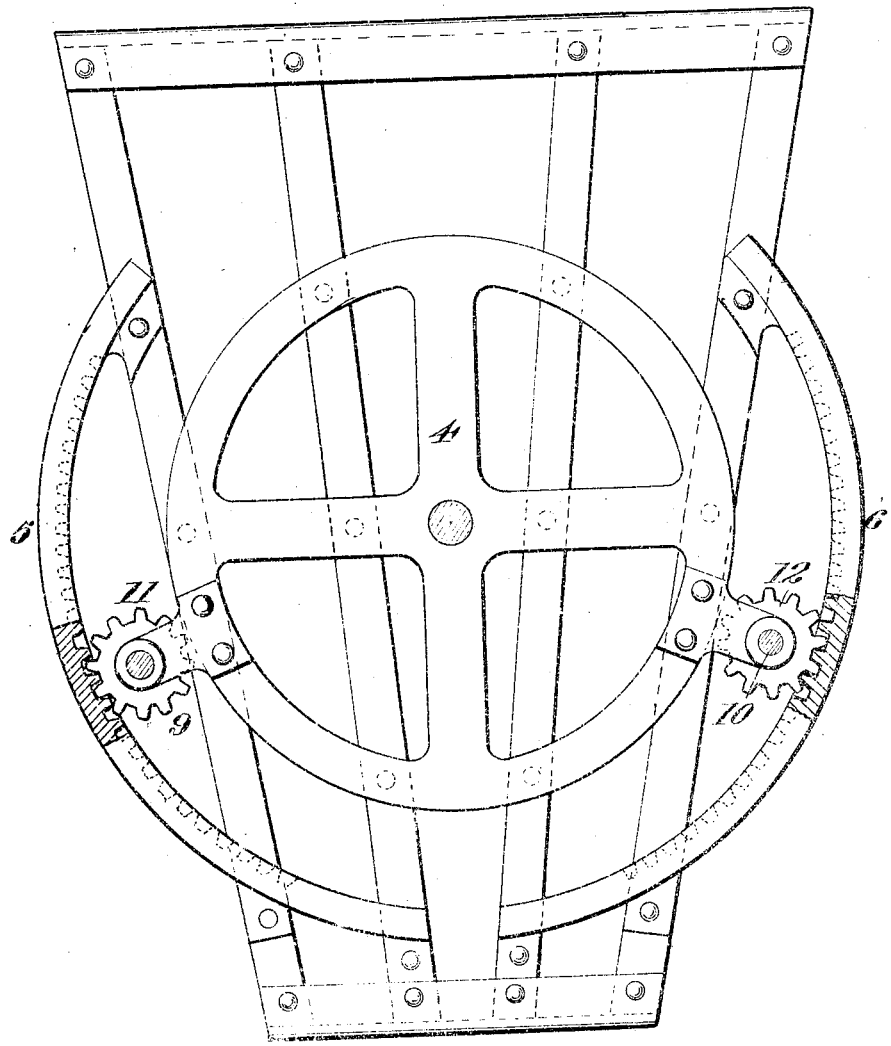

UNITED STATES PATENT OFFICE.

JOHN W. RAFFERTY, OF SAN FRANCISCO, CALIFORNIA.

STEERING-GEAR FOR HOOK-AND-LADDER TRUCKS.

1,126,863.  Specification of Letters Patent.  Patented Feb. 2, 1915.

Application filed August 17, 1914. Serial No. 857,091.

*To all whom it may concern:*

Be it known that I, JOHN W. RAFFERTY, a citizen of the United States, residing in the city and county of San Francisco and State of California, have invented new and useful Improvements in Steering-Gear for Hook-and-Ladder Trucks, of which the following is a specification.

This invention relates to a new type of steering gear for hook and ladder truck.

Most hook and ladder trucks of any size now in use are provided with a rear wheel steering gear and this is, in almost all instances, controlled by a hand operated steering wheel, secured on the upper end of a removable post extending down through the center of the ladders on the truck. The ladders, therefore, cannot be taken off or put on the truck unless the steering post is removed or lifted out of its bearings, nor can the truck be moved from one position to another without replacing the post.

The object of the present invention is to overcome these difficulties and to provide a substantial, rigid, stationary steering gear structure which will in no way interfere with the removal of or putting on of the ladders.

Another object of the invention is to provide means for locking the steering gear on a straight run, thereby relieving the operator of any unnecessary strain.

Further objects will hereinafter appear.

The invention consists of the parts and the construction and combination of parts as hereinafter more fully described and claimed, having reference to the accompanying drawings in which—

Figure 1 is a side elevation of a hook and ladder truck showing the application of the invention; Fig. 2 is a cross section of same on line 2—2 of Fig. 1; Fig. 3 is a plan view of the fifth wheel frame.

A indicates the main frame, 2 the ladders and 3 the rear wheels of a hook and ladder truck. The rear wheels are in this instance, carried by a fifth wheel 4, of the usual construction, upon which is secured a pair of semicircular shaped rack bars 5 and 6. Secured to the sides of the main frame as at 7 is a bridge shaped stationary frame 8, and journaled on the sides of said frame are a pair of vertically disposed shafts 9 and 10, on the lower ends of which are secured pinion gears 11 and 12, pinion 11 being adapted to intermesh with rack 5 and pinion 12 with rack 6. Secured on the upper ends of shafts 9 and 10 are sprocket wheels 13 and 14 and journaled centrally on the frame is a steering post 15, on the lower end of which is secured a pair of sprocket wheels 16 and 17. Sprocket wheels 13 and 16 are connected by a chain 18, and sprocket wheels 14 and 17 are similarly connected by a chain 19. Secured on the upper end of post 15, is a standard form of steering wheel 20, which is positioned within convenient reach of the operator, who generally occupies the seat indicated at 21.

In going to or from a fire and in turning corners, it is only necessary for the operator to turn wheel 20 in the usual manner. This movement is transmitted through sprockets 16 and 17 and chains 18 and 19 to sprockets 13 and 14, which turn the vertical shafts 9 and 10, and this movement is in turn, transmitted through pinion gears 11 and 12 to the rack bars secured on the fifth wheel, thus causing the rear wheels to turn to any desired or necessary angle.

The double arrangement of shafts 9 and 10, together with the bridge like frame, produces a rigid, substantial structure, through which power may be transmitted to turn the fifth wheel with connected wheels 3. This necessitates two pinions, such as indicated at 11 and 12, which engage both sides of the fifth wheel, thus further increasing the strength and rigidity of the steering gear transmission.

Secured to the steering post 15 is a friction drum 22, and surrounding same is a brake band 23, which is controlled by a hand lever 24. This attachment relieves the operator of any unnecessary strain, as he can lock the steering gear by simply pulling on lever 24 when passing over a straight run of any length.

The bridge like structure on the steering gear supporting frame, permits the ladders to be removed or replaced at any time without interfering with the steering gear. This permits quicker action and also eliminates to a more or less extent, the chance of any accident. The common practice of removing the steering post every time the ladders are to be removed or replaced, is thus entirely obviated, and a more rigid and substantial steering gear is provided at the same time.

The materials and finish of the several parts of the steering gear are such as the experience and judgment of the manufacturer may dictate.

I wish it understood that various changes in form, proportions and minor details of construction may be resorted to within the scope of the appendant claims, and that I do not wish to limit myself to the specific design and construction here shown.

Having thus described my invention, what I desire and claim by Letters Patent, is—

1. In combination with the fifth wheel of a vehicle, and a rack having opposite semi-circular toothed parts secured to the fifth wheel, a bridge-member, a pair of vertical shafts each journaled at one end in the member and at its other end in the fifth wheel, a gear on the lower end of each shaft each gear being meshed with the rack, a steering post on the member, and means to actuate each of the shafts from the steering post.

2. In combination with the fifth wheel of a vehicle, and a rack having opposite semi-circular toothed parts secured to the fifth wheel, a bridge-member, a pair of vertical shafts each journaled at one end in the member and at its other end in the fifth wheel, a gear on the lower end of each shaft each gear being meshed with the rack, a bracket on top of the bridge, a steering post journaled in the member and bracket, means to actuate each of the shafts from the steering post, and a hand actuated brake on the bracket engaged with said post.

In testimony whereof I have hereunto set my hand in the presence of two subscribing witnesses.

JOHN W. RAFFERTY.

Witnesses:
  JOHN H. HERRING,
  W. W. HEALEY.